(12) United States Patent
Uke

(10) Patent No.: US 7,038,598 B2
(45) Date of Patent: May 2, 2006

(54) KEYBOARD ASSEMBLIES

(75) Inventor: Alan K. Uke, 355 14th St., Del Mar, CA (US) 92014

(73) Assignee: Alan K. Uke, Del Mar, CA (US)

( * ) Notice: Subject to any disclaimer, the term of this patent is extended or adjusted under 35 U.S.C. 154(b) by 394 days.

(21) Appl. No.: 10/268,365

(22) Filed: Oct. 9, 2002

(65) Prior Publication Data

US 2003/0222800 A1    Dec. 4, 2003

Related U.S. Application Data

(63) Continuation-in-part of application No. 10/156,737, filed on May 29, 2002, now abandoned.

(51) Int. Cl.
*H03M 11/00* (2006.01)
(52) U.S. Cl. .......................... 341/20; 341/22; 400/490; 400/496; 200/302.1; 200/302.2; 345/157
(58) Field of Classification Search .................. 341/20, 341/22; 345/157; 400/490, 496; 367/680; 200/302.1, 302.2
See application file for complete search history.

(56) References Cited

U.S. PATENT DOCUMENTS

| | | |
|---|---|---|
| 1,319,687 A | 10/1919 | Bates |
| 3,736,397 A | 5/1973 | Pedersen |
| 3,787,837 A | 1/1974 | Allen et al. |
| 3,944,042 A | 3/1976 | Gremillet |
| 4,362,408 A | 12/1982 | Cordes et al. |
| 4,661,005 A | 4/1987 | Lahr |
| 4,688,020 A | 8/1987 | Kuehneman et al. |
| 4,791,257 A | 12/1988 | Frey et al. |
| 4,906,117 A | 3/1990 | Birdwell |
| 4,980,522 A * | 12/1990 | Murakami et al. .......... 200/5 A |
| 5,144,302 A | 9/1992 | Carter et al. |
| 5,220,318 A | 6/1993 | Staley |
| 5,421,659 A * | 6/1995 | Liang ......................... 400/472 |
| 5,434,566 A | 7/1995 | Iwasa et al. |
| 5,494,363 A | 2/1996 | Hochgesang |
| 5,588,760 A | 12/1996 | So |
| 5,676,476 A | 10/1997 | Uke |
| 5,790,103 A | 8/1998 | Willner |
| 5,865,546 A | 2/1999 | Ganthier et al. |
| 5,933,133 A | 8/1999 | Lohr |
| 5,954,437 A | 9/1999 | Wen-Hung |
| 6,054,939 A * | 4/2000 | Wei et al. ..................... 341/20 |
| 6,104,604 A | 8/2000 | Anderson et al. |
| 6,156,983 A * | 12/2000 | Chen et al. .............. 200/302.1 |
| 6,178,619 B1 * | 1/2001 | Tai .............................. 29/622 |
| 6,215,420 B1 * | 4/2001 | Harrison et al. ............. 341/22 |
| 6,288,707 B1 * | 9/2001 | Philipp ....................... 345/168 |
| 6,354,210 B1 * | 3/2002 | Chao .......................... 101/472 |

(Continued)

FOREIGN PATENT DOCUMENTS

WO    WO 97/21547    6/1997

(Continued)

*Primary Examiner*—Albert K. Wong
(74) *Attorney, Agent, or Firm*—Foley & Lardner, LLP

(57) ABSTRACT

A keyboard assembly having a housing with one or more openings in which keys are located. A circuit board is located inside the housing and adjacent to the keys such that striking the keys causes switches of the circuit board to be switched. A liquid resistant barrier is located between the keys and the circuit board, protecting the circuit board and/or other electronic components from being contacted by liquids spilled on the keyboard.

35 Claims, 12 Drawing Sheets

U.S. PATENT DOCUMENTS

| | | | |
|---|---|---|---|
| 6,467,683 B1 * | 10/2002 | Jun | 235/145 R |
| 6,542,355 B1 * | 4/2003 | Huang | 361/680 |
| 6,610,944 B1 * | 8/2003 | Lee et al. | 200/302.1 |
| 6,644,874 B1 * | 11/2003 | Tsai | 400/490 |

FOREIGN PATENT DOCUMENTS

| | | |
|---|---|---|
| WO | WO 00/73078 A1 | 12/2000 |
| WO | WO 02/34539 A1 | 5/2002 |

* cited by examiner

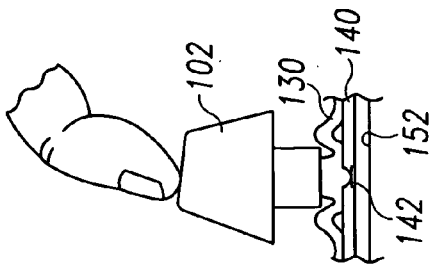
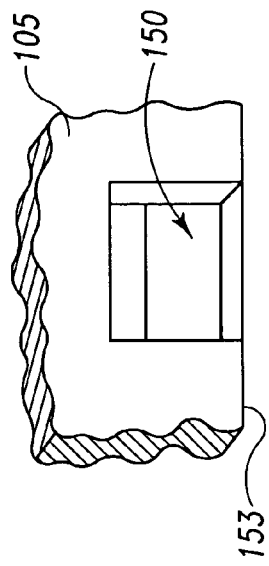
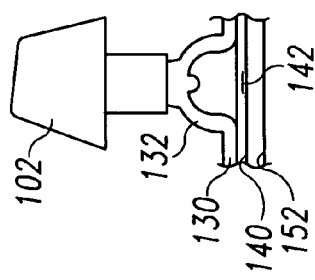
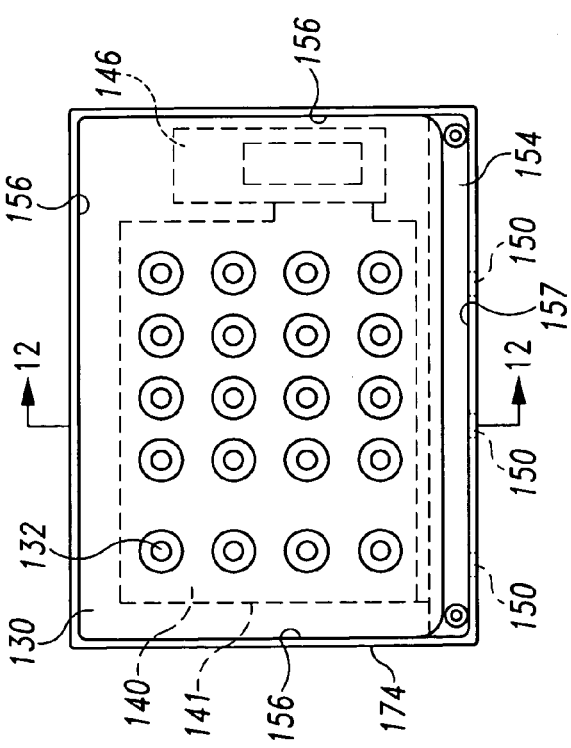
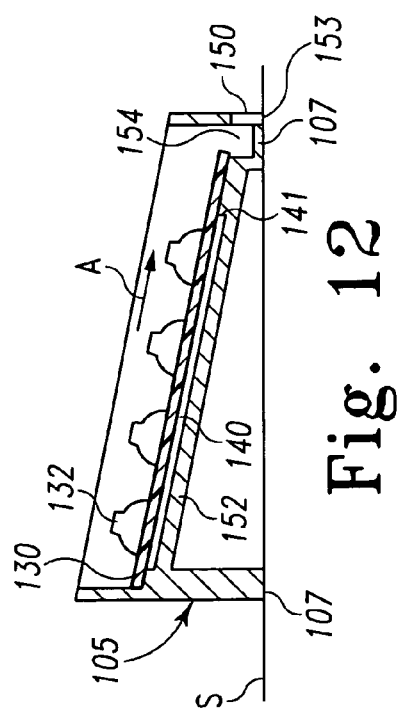

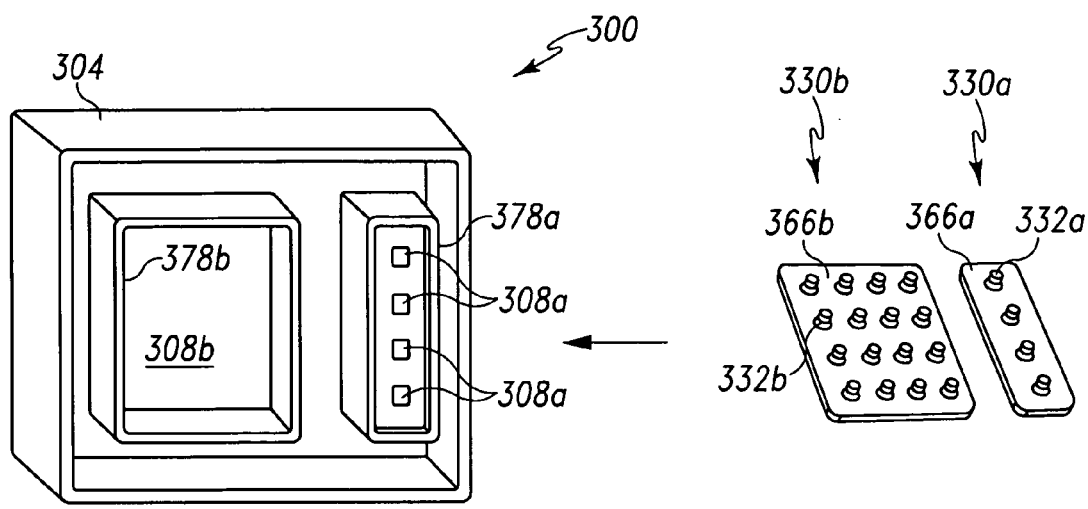
Fig. 19
Fig. 20
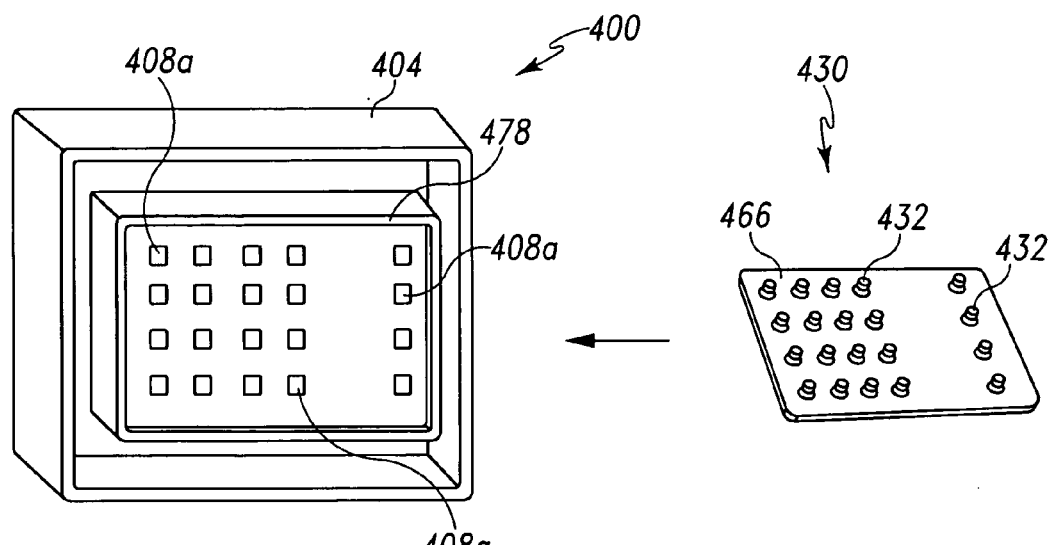
Fig. 21
Fig. 22

KEYBOARD ASSEMBLIES

RELATED APPLICATIONS

This application is a continuation in part of Uke, application Ser. No. 10/156,737, filed May 29, 2002, now abandoned, entitled Keyboard Assemblies, which is incorporated herein by reference in its entirety, including drawings.

FIELD OF THE INVENTION

The present invention relates to keyboard assemblies having improved resistance to liquids.

BACKGROUND

Conventional keyboards for computers, phones, and other electronic devices often include barriers that provide resistance to key movement. For example, one conventional computer keyboard includes a spring template having a number of cups formed from rubber or plastic. When a user of this keyboard strikes the keys of the keyboard, the cups are deflected and make contact with a flexible circuit board located underneath the spring template. This contact causes the flexible circuit board to send a signal to a computer connected to the computer keyboard. Users of keyboards, such as that described above, occasionally spill liquids on the keyboard. These liquids often pass through openings in the barrier or past the edges of the template such that the liquid comes in contact with the flexible circuit board or other electronic components of the keyboard, causing the keyboard to malfunction. Some have attempted to address this problem by providing aftermarket elastic covers for keyboards, such as often seen in restaurants and commercial establishments. Unfortunately, such covers interfere with key striking and quickly degrade due to repetitive use.

In addition, some keyboards for small electronic devices, e.g., handheld calculators and the like, have been constructed with the top surface of the keypad being a single plastic membrane, and the "keys" being small protrusions of that membrane.

SUMMARY OF THE INVENTION

The present invention provides keyboard assemblies that are more resistant to spilled liquids than typical conventional keyboards. This is accomplished by diverting liquids that contact the key area of the keyboard away from electronic components. Techniques for diverting liquids include the use of barriers over electronic components, the inclusion of structures that divert liquid away from electronic components and/or from areas that lead to electronic components, and by draining or channeling liquid away, e.g., to the exterior of the keyboard and/or to a well(s). Thus, the present keyboard assemblies can include a liquid resistant barrier(s) in the keyboard assembly between the keys and electronic components and/or seals for apertures or holes in an otherwise liquid resistant barrier, and/or keyboard structures under the keys to divert liquid away from electronic components, for example, in a keyboard that has a recessed surface with holes to accommodate individual keys, the holes can be surrounded by an elevated ring such that liquid is diverted away from the holes. As the key caps can cover the holes, liquid is, to a large extent prevented from entering the holes. Spilled liquid can further be diverted away from electronic components in the keyboard by suitable channeling or drains. Such keyboard assembly designs are not even limited to making a keyboard assembly liquid resistant, but can make such an assembly essentially liquid-proof by enclosing electronic components in a waterproof volume, thereby tolerating not just liquid spills on the keyboard, but even brief immersion.

Thus, the invention provides a keyboard assembly that includes liquid resistant features as described. Generally such a keyboard includes a housing that has an upper side and a bottom side located opposite from the upper side. The upper side has one or more openings in which a plurality of keys are located, and the bottom side includes a bottom surface upon which the keyboard assembly rests when a user strikes the keys in normal use. The assembly also includes electronic components in the housing, such as a circuit board below the plurality of keys. Such a circuit board typically includes a plurality of switches actuateable by depressing or striking the keys. In addition, the assembly includes a liquid resistant barrier located between the keys and the circuit board and/or other electronic components. The barrier is configured such that the circuit board (and/or other electronic components) is protected from liquid passing down through one or more of the openings.

In certain embodiments, the liquid resistant barrier includes deformable members disposed to resist movement of the keys; the liquid resistant barrier is configured and located to direct liquid that has passed through the key openings to a drain channel in the housing of the keyboard assembly; a seal is defined between the liquid resistant barrier and the housing to prevent liquid that has passed through the key openings from contacting the switches of the circuit board; the upper side of the housing includes a recess having protrusions that moveably receive the keys, preferably liquid spilled into the recess is drained away from the keyboard assembly by a drain channel in communication with the recess.

As the liquid resistant keyboards can be attached to or integrated with other computer components, the invention also provides a computer system that includes a central processing unit (and generally other components typical for computers, e.g., personal and/or mini computers), and a liquid resistant keyboard as described herein.

In another related aspect, the invention provides a method for preventing computer keyboard damage by spilled liquids, by using a liquid resistant keyboard as described herein in the use of a computer.

In yet another related aspect, the invention provides a method for cleaning residue (e.g., residue deposited from a liquid) from a computer keyboard. The method involves washing residue-bearing interior upper surfaces of a liquid resistant keyboard as described herein with a solvent or solution that does not leave harmful residues, e.g., sticky and/or corrosive residues and residues that otherwise interfere with functioning of the keyboard. The method can also include drying solvent from the keyboard after washing (e.g., by blowing air over the wet portions of the keyboard). Useful solvents can include without limitation, water (e.g., de-ionized or distilled water), and organic solvents that do not significantly degrade keyboard components (e.g., housing, liquid barrier) during an interval of washing and drying. Selection of such non-degrading solvents will depend on the composition of other keyboard components that may be contacted by the solvent, but can include, for example, alcohols such as enthanol, denatured ethanol, isopropanol, and mixtures of such alcohols with water (e.g., 70%, 80%, 90%, or 95% alcohol).

As used herein in connection with liquid resistant barriers, the term "liquid resistant" indicates that liquids that commonly might be spilled on a keyboard, e.g., aqueous liquids and ethanol/water combinations, will not penetrate through a continuous barrier layer with 30 seconds of continuous contact at 22° C. Preferably the liquid will not penetrate through with 1 min, 5 min, 10 min, 30 min, 60 min, 10 hr, or even longer contact. Barriers that do not allow the liquid to penetrate with greater than 10 hr continuous contact can be designated as liquid-proof. A barrier can also be designated as resistant to a particular solvent, e.g., water resistant or water proof. Water resistant and water proof barriers are particularly useful in this invention.

In reference to various keyboard or other device components, the term "electronic" refers generally to components utilizing electricity and are not limited to solid state components; the term "electromechanical" refers to components that include both electronic and mechanical components that may move during operation; the term "mechanical" refers to components that involve physical movement (but excluding electronic components with which the mechanical component may be associated).

Other features associated with the present invention will be apparent to those skilled in the art from the following detailed description and from the claims. As will be realized, the invention is capable of other and different embodiments, and its several details are capable of modification in various respects, all without departing from the invention. Accordingly, the drawings and the description are to be regarded as illustrative in nature, and not limiting.

BRIEF DESCRIPTION OF THE DRAWINGS

FIG. 10A is a partial operational view of a key about to deform a deformable member of a liquid resistant barrier of the keyboard assembly illustrated in FIG. 1.

FIG. 10B is a partial operational view of the key of FIG. 10A after it has deformed the deformable member of the liquid resistant barrier and switched a switch of a circuit board of the keyboard assembly illustrated in FIG. 1.

FIG. 11 is a partial top view of a bottom portion of the housing of the keyboard assembly illustrated in FIG. 1, where the liquid resistant barrier covers the circuit board.

FIG. 12 is a cross-sectional view of the partial assembly illustrated in FIG. 11 taken along the line 12—12 of FIG. 11.

FIG. 13 is an enlarged view of a drain channel in the bottom portion of the housing of the keyboard assembly illustrated in FIG. 1, where the drain channel communicates an interior area of the keyboard assembly with an area external of the keyboard assembly.

FIG. 19 is a rear perspective view of an upper portion of a keyboard assembly in accordance with a further embodiment of the present invention.

FIG. 20 is a perspective view of a liquid resistant barrier of the keyboard assembly illustrated in FIG. 19.

FIG. 21 is a rear perspective view of an upper portion of a keyboard assembly in accordance with another embodiment of the present invention.

FIG. 22 is a perspective view of a liquid resistant barrier of the keyboard assembly illustrated in FIG. 21.

DETAILED DESCRIPTION OF THE PREFERRED EMBODIMENTS

Figure 1:
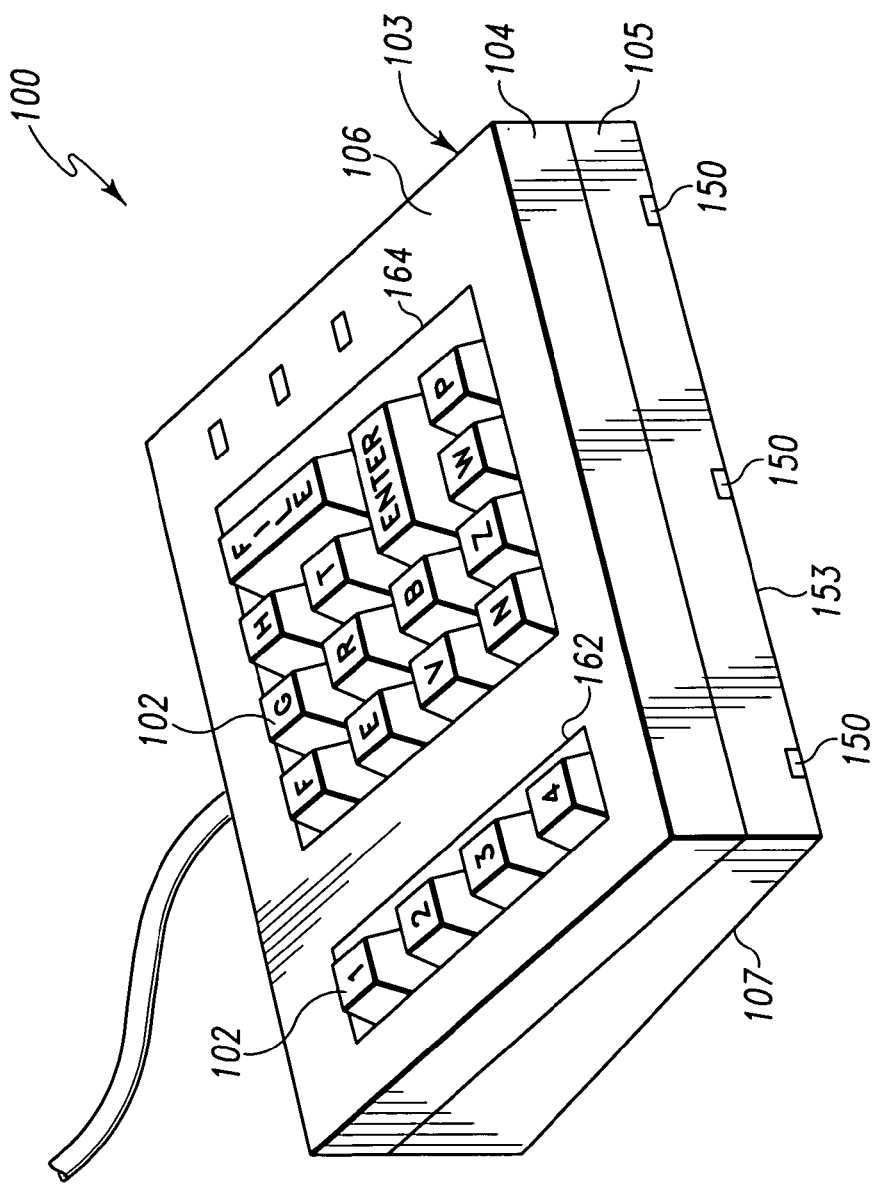
FIG. 1 is a perspective view of a keyboard assembly in accordance with one embodiment of the present invention.

As described in the Summary above, the present invention concerns keyboards that are resistant to spilled liquids, or even essentially liquid-proof. Typically this involves the use of a liquid resistant barrier under the keys and above electronic components in the keyboard and/or by sealing openings in an otherwise liquid resistant barrier, thereby protecting the electronic components from contact with the liquid and from the damaging effects that frequently result from such contact. Such liquid resistant barriers can be constructed without holes, thereby providing a continuous barrier, or can have one or more holes, e.g., to allow placement of fasteners, wires, and the like. Passage of liquid through such a hole can be prevented by sealing the hole, such as with a compression seal, or liquid that passes through such a hole can be channed or drained away from electronic components.

Thus, liquid resistance can also be provided by incorporating a structure or structures in a keyboard that directs liquid spilled in the key area away from electronic components. For example, protrusions in a recessed portion of the upper side of a keyboard, through which keys or key extensions penetrate can be used to inhibit contact between electronic components and to direct liquid to a drain channel or channels. Such constructions can also be used in combination, and/or in combination with other barrier constructs, such as barrier membranes and templates.

Such liquid resistant (or liquid-proof) keyboard assemblies can also allow residue to be washed from the keyboard without damaging (or ruining) the keyboard. Such washing is possible because the liquid resistant properties of the keyboard allow wash solution to be flowed or sprayed over portions of the keyboard that are soiled, but that would be difficult or impossible to wash in conventional (non-liquid resistant) keyboards. For keyboards that are essentially liquid proof, the keyboard can even be briefly submersed in a cleaning solution.

The structures described for keyboard assemblies are not limited to separate keyboards, such as separate computer keyboards, but can also be used in keyboards that are integrated directly in electronic devices. An example is a laptop, notebook, or other portable computer. In such integrated keyboards, the liquid resistant structures can be configured to provide protection not only to the keyboard electronics, but also to other components in the device, e.g., by diverting liquids that would otherwise drain through the keyboard into other components such as electronic components, electromechanical, and/or mechanical components that could be damaged by the liquid (and/or by residue remaining after the solvent(s) evaporate), away from those components. The diversion of the liquid can, for example, be to the exterior of the computer or other device or into a well or wells.

FIGS. 1–26 illustrate exemplary embodiments of keyboard assemblies 100, 200, 300, 400, 500, 600, 700 in accordance with embodiments of the present invention. As described below, the keyboard assemblies 100, 200, 300, 400, 500, 600, 700 are each configured to lessen the chance that any liquid spilled on the keyboard assembly will contact the electrical components thereof. Because the keyboard assemblies 100, 200, 300, 400, 500, 600, 700 are functionally similar and share a number of similar parts, in the following description like numbered parts of the keyboard assemblies 100, 200, 300, 400, 500, 600, 700 are referred to by like numbers, increased by 100's and/or followed by primes (') or letters (a, b, c).

As illustrated in FIG. 1, the keyboard assembly 100 is a device having a plurality of keys 102 that a user strikes when operating the keyboard assembly 100. The keyboard assembly 100 may be a keyboard for a personal computer, a calculator, a laptop computer, a personal digital assistant, a cellular phone, a desktop phone, a register, or other electronic device having keys.

The illustrated keyboard assembly 100 includes a housing 103 having an upper portion 104 and a lower portion 105. In alternative embodiments, the housing 103 may be defined by more or less portions and by differently divided portions. For example, the housing 130 may have lateral halves. In the illustrated embodiment, the upper portion 104 of the housing 103 includes an upper side 106 that typically faces a user of the keyboard assembly 100 during operation of the keyboard assembly 100. Likewise, the bottom portion 105 of the housing 103 has a bottom side 107 that is located opposite from the upper side 106 and is the surface upon which the keyboard assembly 100 typically rests when a user strikes the keys 102. In one embodiment where the keyboard assembly 100 is a keyboard for a personal computer, the keys 102 are arranged in the conventional Qwerty or Dvorak format. In another embodiment, the keys 102 are arranged in a four by three grid, such as on a telephone. The keys 102 have illustrations thereon, such as the illustrated alphanumeric characters.

As is illustrated in FIGS. 6–9, the keys 102 are of a conventional format, preferably each having a non-resilient (stiff) strike portion 110 and a protrusion 109. The protrusion 109 includes retaining clips 111 that retain the key in the keyboard assembly 100 as described below.

Figure 2:
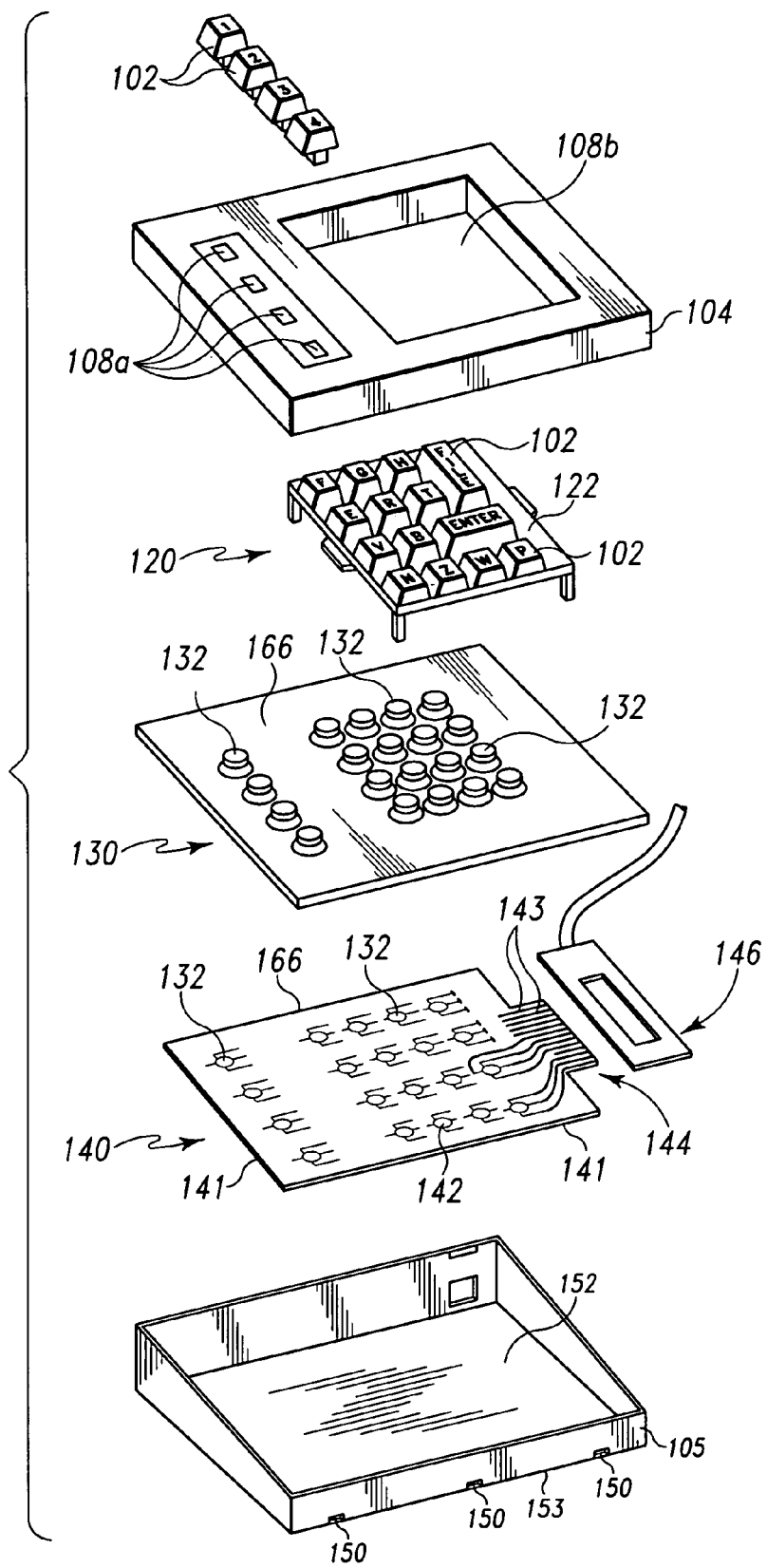
FIG. 2 is an exploded view of the keyboard assembly illustrated in FIG. 1.
Figure 6:
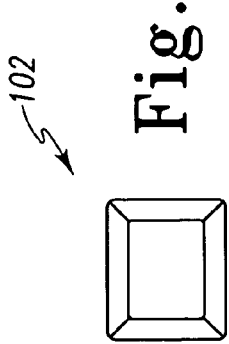
FIG. 6 is a top view of a key of the keyboard assembly illustrated in FIG. 1.
Figure 7:
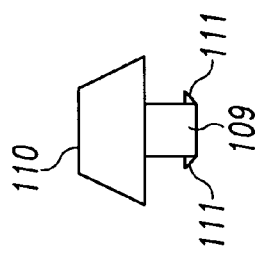
FIG. 7 is a front view of the key illustrated in FIG. 6.
Figure 8:
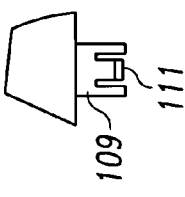
FIG. 8 is a side view of the key illustrated in FIG. 6.
Figure 9:
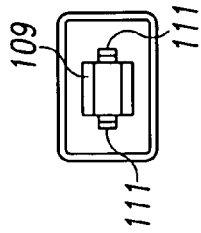
FIG. 9 is a bottom view of the key illustrated in FIG. 6.
Figure 3:
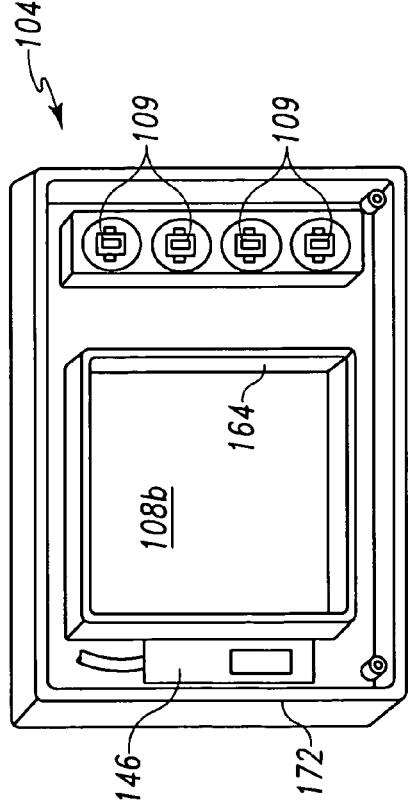
FIG. 3 is a rear perspective view of an upper portion of the housing of the keyboard assembly illustrated in FIG. 1.

As is illustrated in the exploded view of FIG. 2, the upper portion 104 of the housing 103 includes a plurality of openings 108a, 108b in which the keys 102 are located. In an alternative embodiment, the upper portion 104 has only one opening 108b. The openings 108a, 108b are conduits that pass through the housing 103 and are sized to receive a portion of a single key or are sized to receive multiple keys. For example, in the illustrated keyboard assembly 100, the upper portion 104 includes four openings 108a that each receive the protrusion 109 of a single key 102. When assembling the keyboard assembly 100, the retaining clips 111 of each key 102 snap into one of the openings 108a so as to moveably retain the key in the respective opening 108a. In this manner, each opening 108a accommodates movement of one key 102. Hence, FIG. 3 illustrates each of the openings accommodating the respective protrusion 109 of a key 102.

Figure 5:
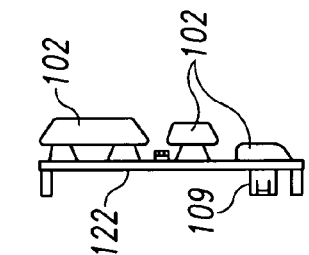
FIG. 5 is a side view of the modular key assembly illustrated in FIG. 4.
Figure 4:
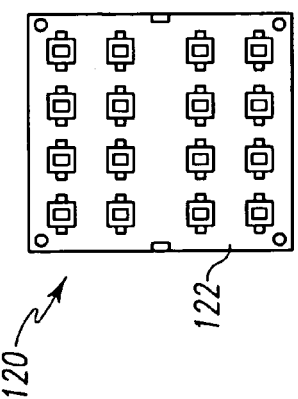
FIG. 4 is a rear view of a modular key assembly of the keyboard assembly illustrated in FIG. 1.

As is also illustrated in FIGS. 2–5, the opening 108b is sized to receive a plurality of keys 102 (at least two). More specifically, the opening 108b receives a modular key assembly 120 having a number of keys 102 thereon. The modular key assembly 120 includes a base plate 122 having a number of openings therein that are similar to the openings 108a in the upper portion 104. Each of the openings in the base plate 122 receives the protrusion 109 and retaining clips 111 of a single key 102 so as to moveably retain the received key in the opening of the base plate. As is illustrated in FIG. 5, each of the keys 102 is freely moveable in the openings of the base plate 122. That is, the keys 102 are not biased in any direction of movement. For purposes of illustration, the top two keys 102 in FIG. 5 have not been depressed, while the bottom key in FIG. 5 has been depressed such that the protrusion 109 protrudes through the base plate 122. As will be apparent, the keys 102 in the openings 108a move with respect to the upper portion 104 of the housing 103 in a similar manner.

When the keys 102 are retained in the base plate 122 to define the modular key assembly 120, the modular key assembly, or at least a portion thereof, is inserted into the opening 108b of the upper portion 104 of the housing 103. The modular key assembly 120 is retained in the opening 108b by one or more clips, screws, snaps, press fits, ledges, locators or other devices of the modular key assembly and/or the housing 103. Because the modular key assembly 120 is located in the opening 108b, the keys 102 are also located in the opening 108b. In this manner, the opening 108b accommodates movement of a plurality of keys 102.

As is apparent, the keys 102 can be retained to the keyboard 100 in other manners, such as those described in U.S. Pat. Nos.: 3,736,397; 4,362,408; 4,791,257; 4,906,117; and 5,676,476, the entire disclosures of which are hereby incorporated by reference.

The keyboard assembly 100 also includes a liquid resistant barrier 130, which is illustrated in FIGS. 2, 10A, 108, 11, and 12. The liquid resistant barrier 130 is a sheet-like member formed of a material that has the capacity to resist the passage of inert liquids therethrough, such as water based liquids commonly spilled on keyboards. As is illustrated in the Figures, the liquid resistant barrier 130 includes a plurality of deformable members 132 that protrude from an upper surface 166 of the barrier.

When the liquid resistant barrier 130 is located in the keyboard assembly 100, the deformable members resist movement of the keys. That is, one or more of the deformable members 132 is disposed directly adjacent the protrusion 109 (or other intermediary member) such that when a user strikes a key 102, the deformable member resists movement of the key. For example, FIG. 10A illustrates a key 102 located directly adjacent a deformable member 132 prior to a user striking the key; the deformable member 132 is resisting movement of the key to keep the key in the static position illustrated in FIG. 10A. When a user strikes the key 102 with sufficient force to overcome the resistance of the deformable member 132, the deformable member will deform as illustrated in FIG. 10B. When the user removes the striking force, the deformable member and the adjacent key 102 will return to the static positions illustrated in FIG. 10A.

The liquid resistant barrier 130 and its deformable members 132 are preferably constructed of a liquid resistant and elastomeric material having a suitable durometer or hardness necessary to achieve a desired keystroke resistance. For example, the liquid resistant barrier may be constructed, i.e., molded, cast, stamped, woven, etc., from a polymeric material, such as polyurethane, polypropylene, polyethylene, equivalents of these materials, and blends of these materials. Additionally, the liquid resistant barrier may be constructed of a synthetic or natural rubber. The liquid resistant barrier may also be fabricated from a conductive elastomeric material. In a further embodiment, the liquid resistant barrier 130 is formed from a combination of materials, such as a woven nylon sheet having polyethylene deformable members 132 secured thereto. The deformable members 132 of the liquid resistant barrier 130 may be similar to that described in WO 00/73078 A1 and U.S. Pat. Nos. 5,494,363, 5,588,760 and 5,933,133, the entire disclosures of which are hereby incorporated by reference. In a preferred embodiment, the liquid resistant barrier 130 is the only device that resists movement of the keys 102. That is, the keyboard assembly 100 preferably does not include any other devices besides the deformable members 132 of the liquid resistant barrier 130 that resist striking movement of the keys 102. However, in alternative embodiments, movement of the keys 102 is resisted by devices in addition to the deformable members 132 of the liquid resistant barrier 130. For example, movement of the keys 102 may also be resisted by one or more springs or pads, such as that described in some the earlier referenced patent publications.

As is also illustrated in FIGS. 2, 10A, 10B, 11, and 12, a circuit board 140 is located directly underneath the liquid resistant barrier 130. Hence, the liquid resistant barrier 140 is located between the keys 102 and the circuit board 140. The circuit board 140 is of a conventional construction and has a plurality of switches 142 that are switched, i.e. tripped or closed, when the deformable member contacts the circuit board as illustrated in FIG. 10B. When the deformable member 132 contacts the circuit board 140, a signal is sent via the circuits of the circuit board 140. In one embodiment, the circuit board 140 is a flexible membrane type circuit board, which is widely employed in the keyboards of personal computers, such as those illustrated in U.S. Pat. Nos. 5,434,566 and 5,588,760, the entire disclosure of which are hereby incorporated by reference. A suitable flexible membrane type circuit board includes two flexible films on which electrical contacts are formed in opposed relation with a spacer barrier therebetween. The spacer barrier includes a number of holes therethrough that are located at positions corresponding to the contacts of the respective barriers. When a key 102 deforms the deformable member 132, the deformable member will cause the opposed electrical contacts to touch and close the switch. In a further embodiment, the circuit board 142 is a single barrier type circuit board, and each deformable member has a conductive insert therein or is formed of a conductive material. When the conductive insert or the conductive deformable member contacts the barrier, it creates an electrical contact to switch one of the switches 142. An example of this type of circuit board is described in U.S. Pat No. 5,494,363, the entire disclosure of which is also hereby incorporated by reference.

As is illustrated in FIG. 2, the switches 142 of the circuit board 140 are connected via conductive lines or patterns to connecting lines 143 of a tongue 144 in the conventional manner. As is known, each switch 142 corresponds to a specific key 102, depending upon each keys respective position. The connecting lines 143 of the tongue 144 are in turn connected to a printed circuit board 146 or equivalent device, which translates the signals from the switches 142 in any one of a variety of conventional manners. The printed circuit board 146 is in turn connected to an electronic cord that protrudes from the keyboard assembly 100. In alternative embodiments, the keyboard assembly is battery powered, has a wireless communication link with an associated device, such as a computer, and does not have the illustrated electronic cord.

In the keyboard assembly 100, the liquid resistant barrier 130 (located between the keys in the openings 108a, 108b and the circuit board 140) and the housing 103 are configured such that any liquid that passes through the openings 108a, 108b is directed to an area external of the keyboard assembly when the bottom surface 107 of the keyboard assembly is horizontal, such as when resting upon a flat and level surface S. This directing of the liquid is achieved by using the assistance of gravity to direct the liquid along the liquid resistant barrier 130 to one or more drain channels 150 of the keyboard assembly 100. In the illustrated embodiment, the liquid resistant barrier 130 and the circuit board 140 are at an incline with respect to the flat and level surface S upon which the bottom surface 107 rests. As is best illustrated in FIG. 12, the lower portion 105 of the housing 103 includes a support 152, which may be part of the lower portion 105 and/or a separate intermediate member, upon which the circuit board 140 and the liquid resistant membrane rests. Because the support 152 is at an incline with respect to horizontal, the liquid resistant barrier 130 is also at an incline. Hence, when liquid passes through the openings 108a, 108b, the liquid is directed via gravity in the direction A generally toward the lower most edge 153 of the bottom housing 105 where a well 154 is located. The well 154 is a recess, groove, indentation, channel, or other area configured to receive liquid directed by the liquid resistant barrier 130 and is at a lower elevation than at least a portion of the liquid resistant barrier, preferably at a lower elevation than a lower most edge of the liquid resistant barrier.

As is also illustrated in FIGS. 1, 2, 11, 12, and 13, the bottom portion 105 of the housing 103 includes three drain channels 150, which are openings, passageways, conduits, or similar throughways that communicate the area external of the keyboard assembly 100 with the location in the housing 103 where the liquid is directed by the liquid resistant barrier 130. Like the well 154, the drain channels 150 are also at a lower elevation than at least a portion of the liquid resistant barrier, preferably at a lower elevation than a lower most edge of the liquid resistant barrier. In the illustrated embodiment, the liquid is directed by the liquid resistant barrier 130 to the lower most edge 153 where the well 154 is located. Because the drain channels 150 are located at the lower most edge 153 of the bottom portion 105, directly adjacent the well 154, liquid that has passed through the openings 108a, 108b will flow along the liquid resistant barrier 130 to the well 154 and then drain out of the keyboard assembly 100 via one or more of the drain channels 150. In this manner, the liquid resistant barrier 130 and the housing 103 are configured such that liquid that has passed through the openings 108a, 108b is directed to an area external of the keyboard assembly when the keyboard assembly 100 is resting upon the bottom surface 107. In an alternative embodiment, the keyboard assembly 100 includes only one drain channel. In a further embodiment, the keyboard assembly 100 does not include the well 154. Rather, the edge of the liquid resistant barrier 130 terminates at the wall of the housing in which the drain channel is located such that the liquid is directed by the liquid resistant barrier directly to the drain channel.

As is illustrated in FIG. 11, to further reduce the possibility that liquid will not contact the switches 142 of the circuit board, the liquid resistant barrier 130 covers an entirety of the circuit board 140. That is, the liquid resistant barrier 130 extends beyond a peripheral edge or perimeter 141 of the circuit board 140 such that the perimeter of the liquid resistant barrier encompasses the perimeter 141 of the circuit board. Additionally, to further reduce the possibility that liquid will contact the switches 142 and other electrical components, the liquid resistant barrier 130 extends past the edge 141 of the circuit board 140 to such an extent that the barrier also covers the printed circuit board 146.

In the illustrated embodiment, the liquid resistant barrier 130 contacts the interior surface of three walls 156 of the housing 103, but does not contact the wall 157 through which the drain channels 150 pass such that liquid that is directed toward the wall 157 falls into the well 154. Hence, when liquid passes through the openings 108a, 108b, it will fall onto the liquid resistant barrier 130 and be directed toward the drain channels 150, rather than contacting and possibly damaging the printed circuit board 146 and/or the switches 142 of the circuit board 140. In an alternative embodiment, the liquid resistant barrier 130 contacts all four walls 156, 157 and has one or more openings passing through the barrier directly above the well 154 such that liquid directed toward the wall 157 drops through the openings of the barrier and into the well.

In a further embodiment, a liquid impervious seal is defined between the liquid resistant barrier 130 and the walls 156, such as by a press fit or by an adhesive. The liquid resistant barrier 130 is preferably continuous, i.e., devoid of any holes or openings passing therethrough, at least in an area of the liquid resistant barrier that covers the circuit board 140. In the illustrated embodiment, the liquid resistant barrier is continuous across an entirety of the covered area. In an alternative embodiment, the liquid resistant barrier 130 includes openings passing therethrough in the area of the barrier that does not cover the circuit board. In a further embodiment, the liquid resistant barrier 130 includes openings that sealingly receive mounting pegs, pins, wires or other protrusions such that liquid is prevented from passing through such openings. The sealing can be accomplished in various ways, such as by compression of an elastomeric material (e.g., shaped as a circular grommet), or by placement of a sealant, such as a silicone sealant. In certain embodiments, a liquid resistant barrier 130 has elevated sections along part of the periphery, to prevent liquid from spilling over those periphery portions. Generally such embodiments will have at least a portion of the lowest edge of the barrier that does not have such elevated section so that liquid will drain from the surface of the barrier at that edge portion.

Figure 14:
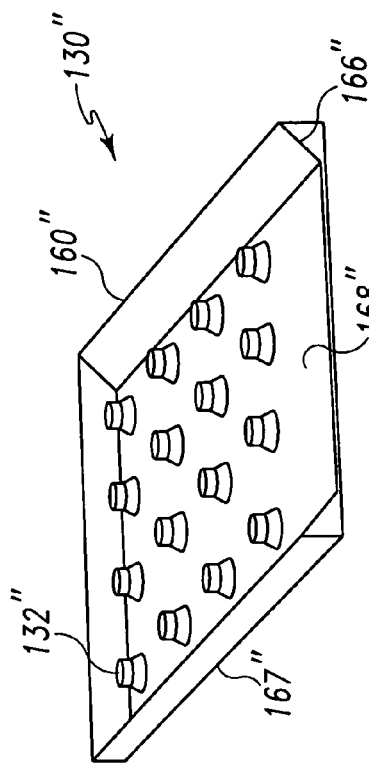
FIG. 14 is a perspective view of an alternative embodiment of a liquid resistant barrier usable with the keyboard assembly illustrated in FIG. 1.
Figure 15:
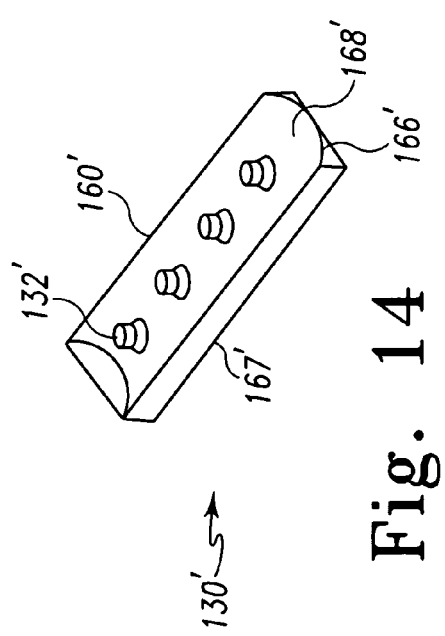
FIG. 15 is a perspective view of an alternative embodiment of a liquid resistant barrier usable with the keyboard assembly illustrated in FIG. 1.

The liquid resistant barrier 130 need not contact the walls 156 to still fall within an embodiment of the present invention. For example, in an alternative embodiment of the keyboard assembly 100, the liquid resistant barrier 100 does not extend to the walls 156, but is rather located only underneath the openings 108a, 108b. For example, FIGS. 14 and 15 illustrate alternative embodiments of two liquid resistant barriers 130', 130" of the keyboard assembly 100. The liquid resistant barrier 130' is configured to fit directly underneath the opening 108a of the upper housing 104 and has a perimeter 160' that encompasses all of the openings 108a when located directly underneath the openings 108a. Likewise, the liquid resistant barrier 130" is configured to fit directly underneath the opening 108b of the upper housing 104 and has a perimeter 160" that is larger than the perimeter 164 of the opening 108b so as to encompass the perimeter of the opening 108b. Each of the liquid resistant barriers 130' 130" preferably have upper surfaces 166', 166" that are sloped, i.e., deviate from horizontal, as measured with respect to a base surface 167', 167" of the respective barrier. In the illustrated embodiment, the upper surfaces 166', 166" curvilinearly slope toward a center area 168', 168" of the respective barrier such that liquid that passes through each opening 108a, 108b and falls on each barrier 130', 130" is directed toward the center area of the liquid resistant barrier. When located in the keyboard assembly 100 in lieu of the liquid resistant barrier 130, the liquid resistant barriers 130', 130" do not cover the entire peripheral edge 141 of the circuit board 140 and do not contact the inner walls 156 of the housing 103, but are still located so as to catch liquid that falls through the openings 108a, 108b when the keyboard assembly 100 rests upon the planar and level surface S. Liquid that passes through the openings 108a, 108b when the keyboard assembly 100 is resting upon the surface S will be directed to the center areas 168', 168" via the sloped walls 166', 166", to the well 154, and then out of the keyboard assembly via a drain channels 150.

Figure 16:
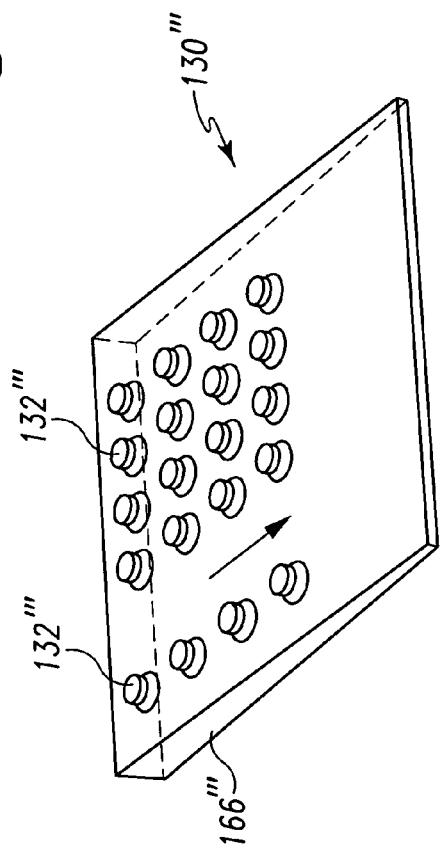
FIG. 16 is a perspective view of an alternative embodiment of a liquid resistant barrier usable with the keyboard assembly illustrated in FIG. 1.

As will be appreciated, the drain channels 150 can be located at other locations of the housing 103 and the liquid resistant barrier 130 can be inclined at various degrees and in various directions toward such drain channels. For example, in one embodiment, the drain channels 150 are located at a lower most edge of the bottom housing 105 that is opposite from the front lower most edge 153. In this embodiment, the liquid resistant barrier 130 is inclined toward the rear lower most edge so as to direct liquid that has passed through the openings 108a, 108b to such located drain channels. In addition, the base 152 of the housing need not be inclined with respect to horizontal. For example, the base 152 upon which the liquid resistant barrier 130 and the circuit board 140 rest may be parallel with horizontal. To achieve an incline to direct liquid to the drain channel of the housing 103, the upper surface 166 of the liquid resistant barrier 130 may be contoured to create an incline. For example, FIG. 16 illustrates an alternative liquid resistant barrier 130''' of the keyboard assembly 100, where the upper surface 166''' of the liquid resistant barrier 130''' —is an incline to direct liquid toward the well 154 and drain channels 150.

Although the above described embodiments of the present invention are well suited for keyboard assemblies 100 that rest upon the planar and level surface S during normal operation, such as is the case with computer keyboards, telephones, registers, etc., some keyboard assemblies are manipulated such that more protection is beneficial. For instance, some keyboard assembly are used in environments where the keyboard assembly is vibrated, inclined with respect to horizontal, and/or continuously moved, such as is the case with cellular telephones. In these instances, it is desirable to have greater protection from liquid that might enter the openings 108a, 108b. FIGS. 17–23 illustrate keyboard assemblies 200–500 in accordance with further embodiments of the present invention that are suitable for such environments.

Figure 18:
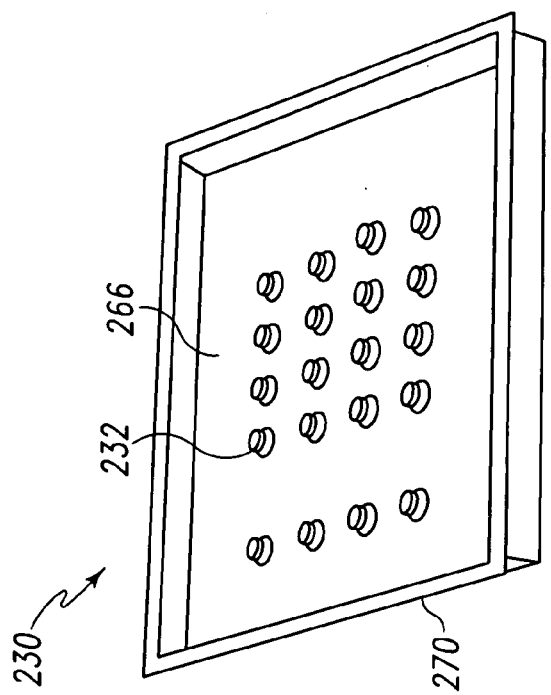
FIG. 18 is a perspective view of a liquid resistant barrier of the keyboard assembly illustrated in FIG. 17.
Figure 17:
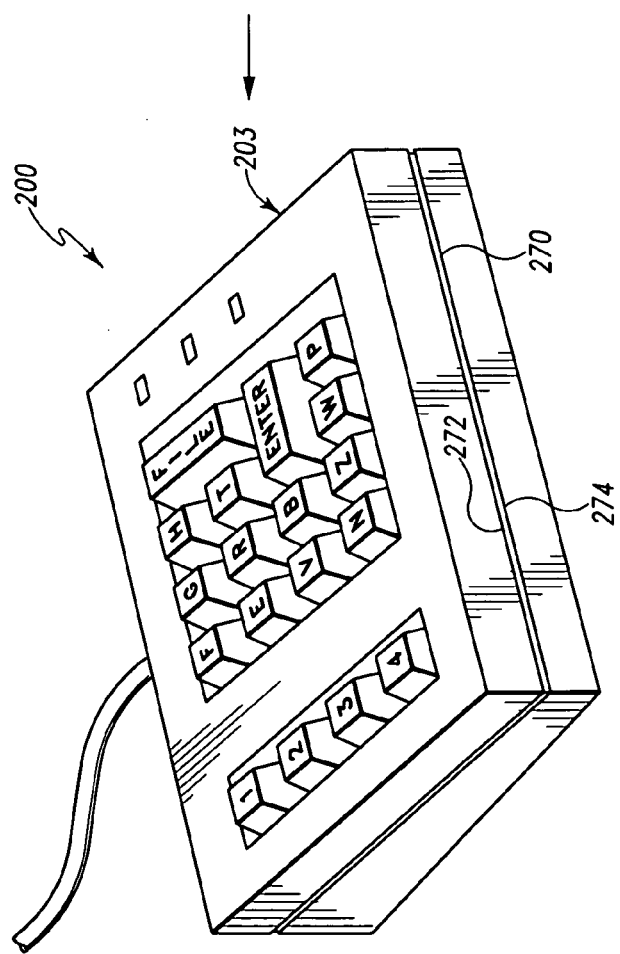
FIG. 17 is a perspective view of an alternative embodiment of a keyboard assembly in accordance with another embodiment of the present invention.

FIGS. 17 and 18 illustrate another embodiment of a keyboard assembly 200 in accordance with the present invention. The keyboard assembly 200 is similar to the keyboard assembly 100. Hence, the liquid resistant barrier 230 includes a plurality of deformable members 232. However, in the keyboard assembly 200, a seal is defined between the liquid resistant barrier 230 and the housing 203 to prevent the passage of liquid between the housing and the barrier such that liquid that enters the key openings of the housing 203 is prevented from contacting the switches of the circuit board located underneath the liquid resistant barrier 230. In the embodiment illustrated in FIGS. 17 and 18, the liquid resistant barrier 230 includes a lip 270 that is raised with respect to the upper surface 266 of the liquid resistant barrier 230 to define a recess or well in which to catch liquid that has passed through the key openings in the housing 203. As is illustrated in FIG. 17, the lip 270 of the liquid resistant barrier 230 is sandwiched or squeezed between the opposing outer edges 272, 274 of the upper and lower portions of the housing 203 to define a seal between the liquid resistant barrier 230 and the housing. Hence, the liquid resistant barrier 230 defines a complete barrier between the key openings and the electrical components of the keyboard assembly. Liquid that enters the key openings is collected by the recess of the liquid resistant barrier 230, but is not drained from the housing 203 of the keyboard assembly 200 via drain channels. Rather, the liquid is retained in the resistant barrier 230 where it will harmlessly evaporate. Additionally, a user of the keyboard assembly 200 may rotate the keyboard assembly to discharge the liquid from the recess of the liquid resistant barrier 230 back through the key openings of the housing 203.

FIGS. 19 and 20 illustrate a further embodiment of a keyboard assembly 300 in accordance with the present invention. For purposes of illustration, only the upper portion 304 of the housing 303 is illustrated along with the liquid resistant barriers 330a, 330b. As is illustrated in FIG. 20, the liquid resistant barriers 330a, 330b are entirely planar except for the deformable members 332a, 332b protruding from the upper surface 366a, 366b thereof. The planar upper surfaces 366a, 366b of each liquid resistant barrier 330a, 330b are sized to abut correspondingly sized walls or lips 378a, 378b of the upper portion 304 of the housing 303. That is, when the keyboard assembly 300 is assembled, the perimeter of the liquid resistant barrier 330a encompasses the perimeter of the lip 378a, and the perimeter of the liquid resistant barrier 330b encompasses the perimeter of the lip 378b and the opening 308b. As is illustrated in FIG. 19, the first lip 378b protrudes from the interior of the upper housing 304 and surrounds the perimeter of the opening 308b; the second lip 378a protrudes from the interior of the upper housing 304 and surrounds the perimeters of the openings 308a. When the keyboard assembly 300 is assembled, the upper surface 366a of the liquid resistant barrier 330a abuts the lip 378a to define a seal between the liquid resistant barrier 330a and the upper portion 304 of the housing 303 that does not permit liquid to pass thereby. The seal may be defined with an adhesive or similar material by a press fit between the upper portion and the lower portion of the housing 303, and/or by a weld. A similar seal is defined between the lip 378b and the second liquid resistant barrier 330b to prevent the passage of liquid between the housing and the barrier.

FIGS. 21 and 22 illustrate a further embodiment of a keyboard assembly 400 in accordance with the present invention. For purposes of illustration, only the upper portion 404 of the housing 403 is illustrated along with the liquid resistant barrier 430. As is illustrated in FIG. 22, the liquid resistant barrier 430 is entirely planar except for the deformable members 432 protruding from the upper surface 466 thereof. The planar upper surface 466 of the liquid resistant barrier 430 is sized to abut correspondingly sized walls or lips 478 of the upper portion 404 of the housing 403. That is, when the keyboard assembly 400 is assembled, the perimeter of the liquid resistant barrier 430 encompasses the perimeter of the lip 478. As is illustrated in FIG. 21, the lip 478 protrudes from the interior of the upper housing 404 and surrounds the perimeters of the openings 408a. When the keyboard assembly 400 is assembled, the upper surface 466 of the liquid resistant barrier 430 abuts the lip 478 to define a seal between the liquid resistant barrier 430 and the upper portion 404 of the housing 403 that does not permit liquid to pass thereby. The seal may be defined with an adhesive or similar material by a press fit between the upper portion and the lower portion of the housing 403, and/or by a weld.

Figure 23:
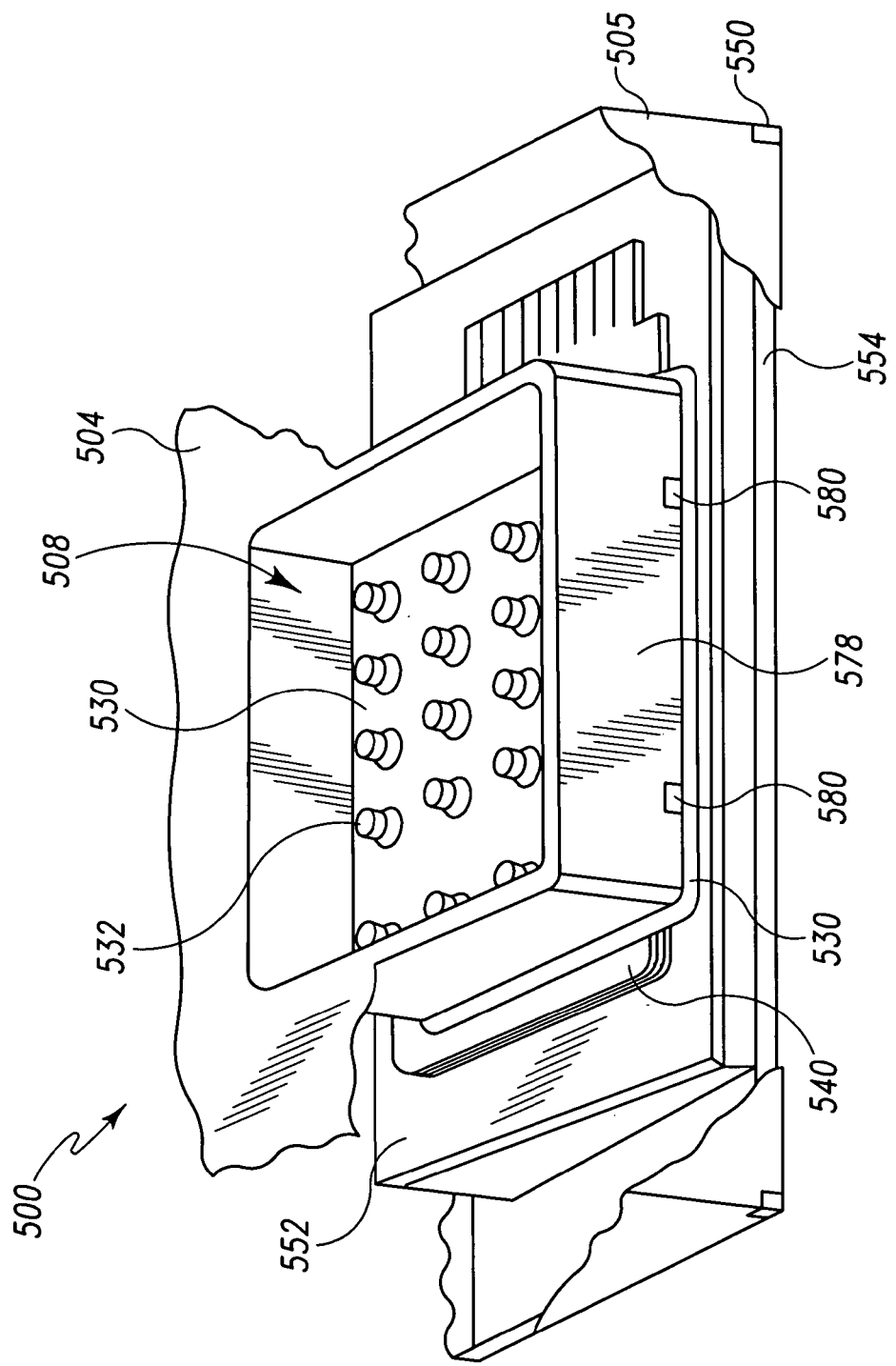
FIG. 23 is a partial, exposed view of a keyboard assembly in accordance with another embodiment of the present invention.

FIG. 23 illustrates another embodiment of a keyboard assembly 500 in accordance with the present invention. For purposes of illustration, the keys and/or modular key assembly of the keyboard assembly 500 have been omitted. Like the keyboard assembly 100, the keyboard assembly 500 includes a housing having an upper portion 504 and a lower portion 505. The upper portion 504 of the housing includes an opening 508 in which the keys are located. The keyboard assembly 500 also includes a liquid resistant barrier 530 having a plurality of deformable members 532 that resist movement of the keys. A circuit board 540 is located directly underneath the liquid resistant barrier 530. When a key deforms one or more deformable members 532, the deformable member will close a switch of the circuit board 640. Similar to the embodiments illustrated in FIGS. 19–22, a seal is defined between the upper portion 504 of the housing 503 and the liquid resistant barrier 530. However, in this embodiment, the lip 578 of the upper portion 504 of the housing includes drain channels 580 through which liquid that has passed through the openings 508a, 508b may drain from the sealed area within the housing. The lower portion 505 of the housing includes a support or protrusion 552 upon which the circuit board 540 and the liquid resistant barrier rest. Because the support 552 is at an incline with respect to horizontal, the liquid resistant barrier 530 is also at an incline. Hence, the liquid resistant barrier 530 and the circuit board 540 are at an incline with respect to the flat and level surface upon which the keyboard assembly rests such that liquid that has passed through the opening 508 is directed via gravity toward the drain channels 580. Similar to the embodiment illustrated in FIGS. 1–12, liquid that drains from the separate drain channels 580 will enter into the well 554 within the lower portion 505 of the housing 503 and eventually drain from drain channels 550 at the corners of the lower portion of the housing.

Figure 24:
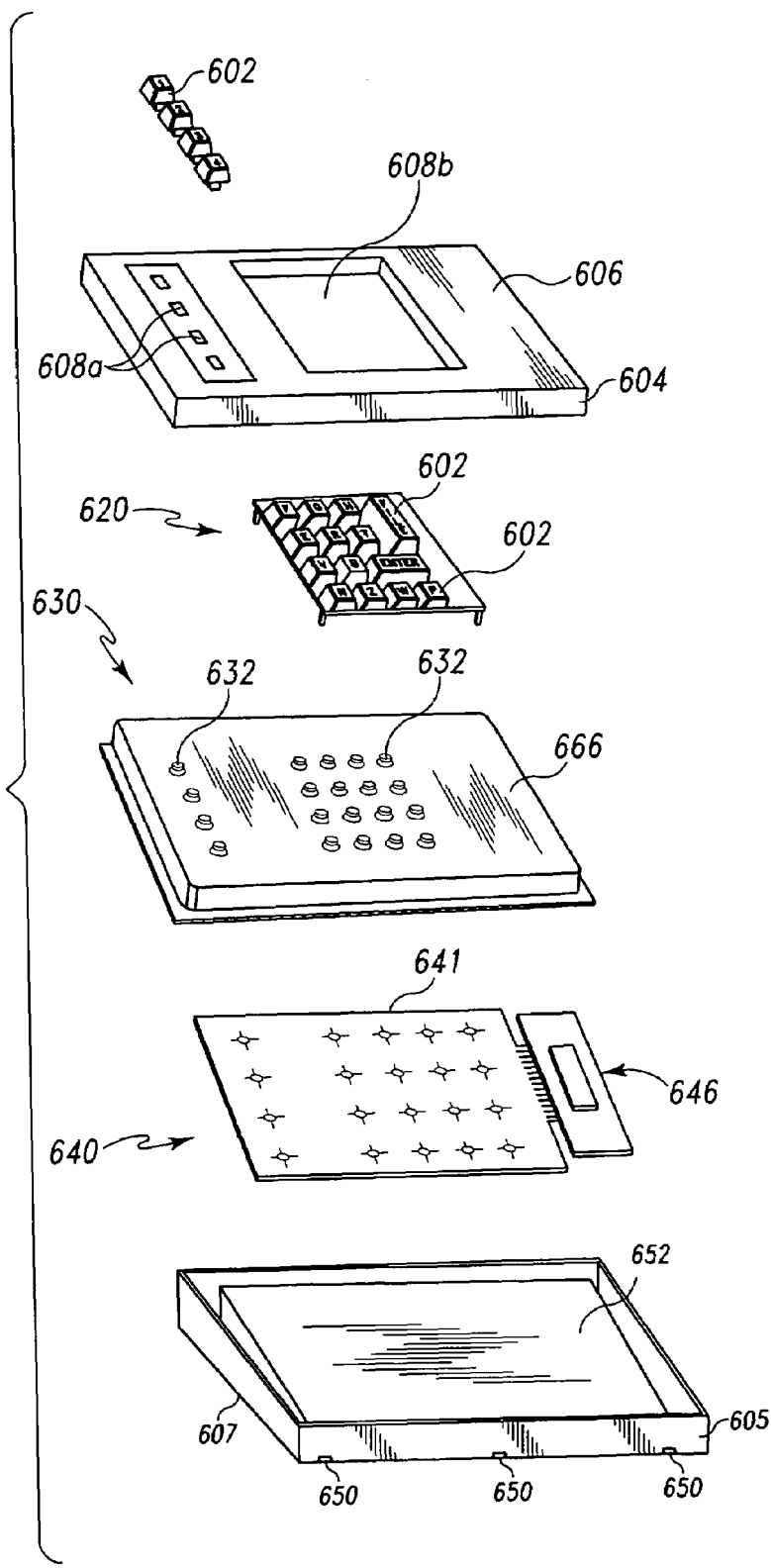
FIG. 24 is an exploded view of a keyboard assembly in accordance with another embodiment of the present invention.

FIG. 24 illustrates another embodiment of a keyboard assembly 600 in accordance with the present invention. Like the keyboard assembly 100, the keyboard assembly 600 includes a plurality of moveable keys 602 and a housing having an upper portion 604 and a lower portion 605, where the upper portion 604 of the housing includes an upper side 606 that faces a user of the keyboard assembly 600 during operation of the keyboard assembly 100 and the bottom portion 605 of the housing has a bottom side 607 upon which the keyboard assembly 600 typically rests when a user strikes the keys 102. The upper portion 604 of the housing includes a plurality of openings 608a, 608b in which the keys 602 are located. The opening 608b receives a modular key assembly 620 having a number of keys 602 thereon.

The keyboard assembly 600 also includes a liquid resistant barrier 630 having a plurality of deformable members 632 that protrude from an upper surface 666 of the barrier and resist movement of the keys 602. A circuit board 640 is located directly underneath the liquid resistant barrier 630. When a key 602 deforms one or more deformable members 632, the deformable member will close a switch 642 of the circuit board 640. The connecting lines of the circuit board 640 are connected to a printed circuit board 646 or equivalent device. As is illustrated in FIG. 24, the liquid resistant barrier 630 is contoured in the shape of a pan or cap such that it has a recess that receives the circuit board 640 and printed circuit board 646. Hence, the liquid resistant barrier 630 receives and overlaps the perimeter 641 of the circuit board 640. The lower portion 605 of the housing includes a support or protrusion 652 upon which the circuit board 640 and the liquid resistant barrier rests. Because the support 652 is at an incline with respect to horizontal, the liquid resistant barrier 630 is also at an incline. Hence, the liquid resistant barrier 630 and the circuit board 640 are at an incline with respect to the flat and level surface upon which the bottom surface 607 rests such that liquid that has passed through the openings 608a, 608b, is directed via gravity toward the lower most edge of the lower portion 605 where drain channels 650 are located.

Figure 25:
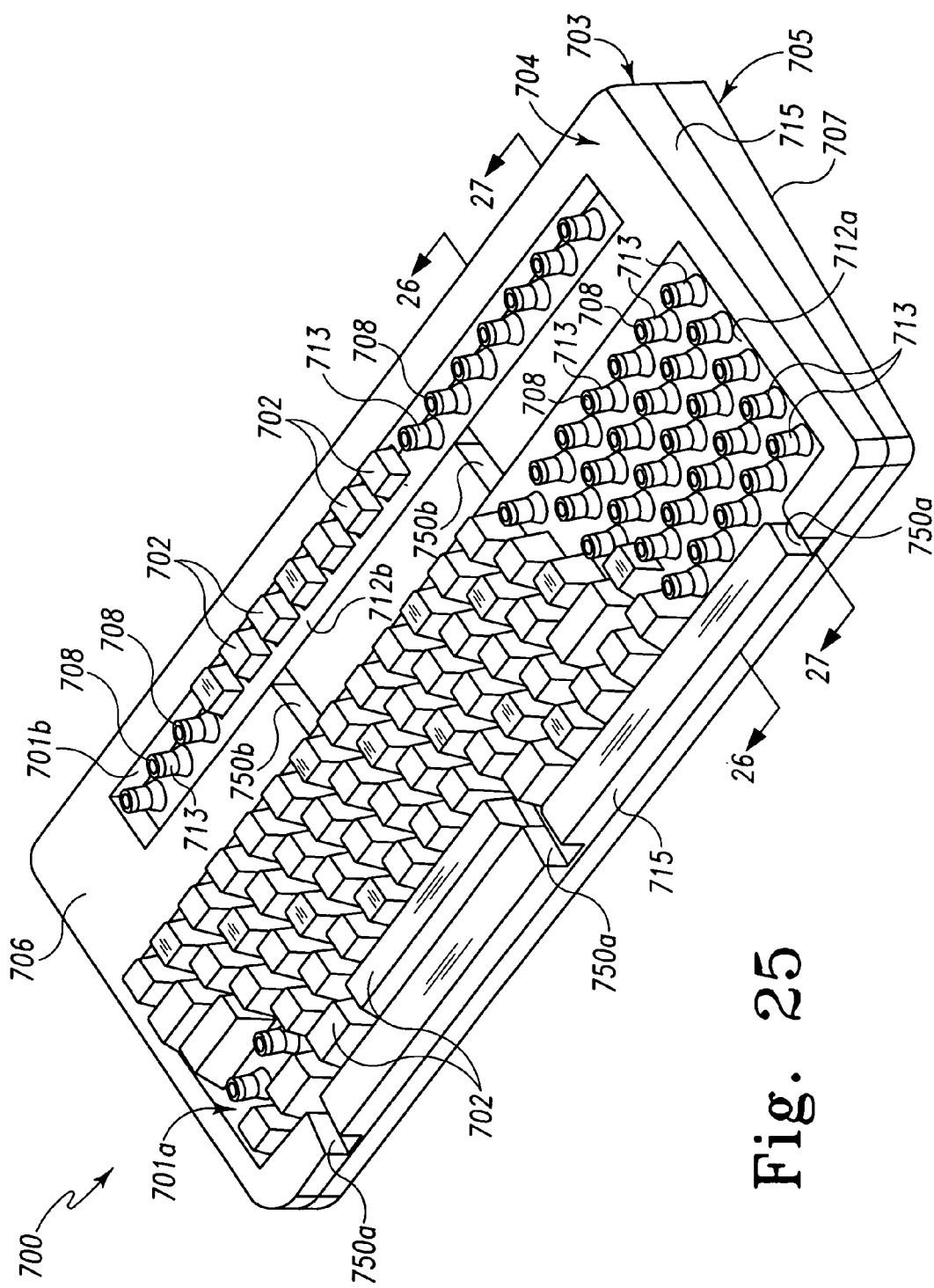
FIG. 25 is a perspective view of a keyboard assembly in accordance with another embodiment of the present invention.
Figure 26:
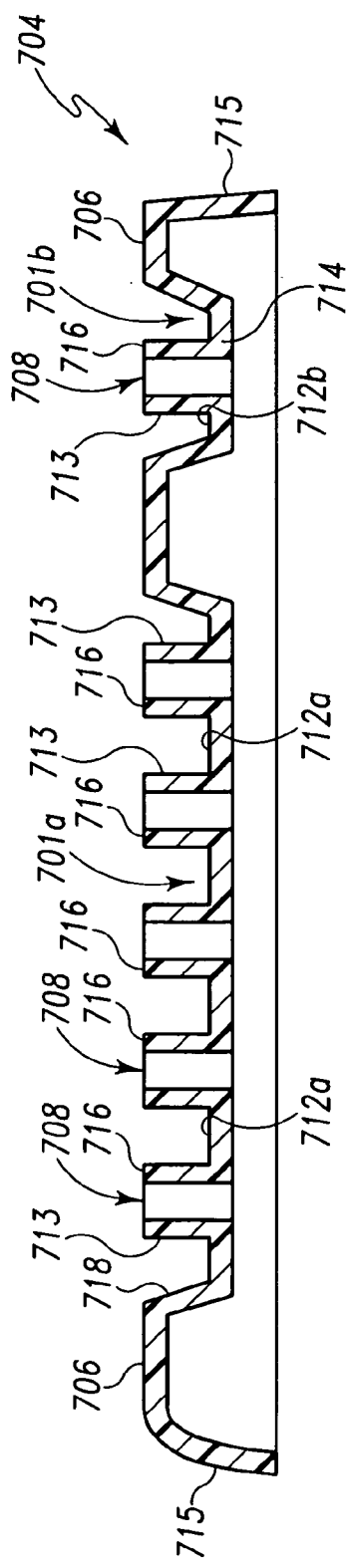
FIG. 26 is a cross-sectional view of the upper portion of the keyboard assembly illustrated in FIG. 25 taken along the line 26—26 in FIG. 25.
Figure 27:
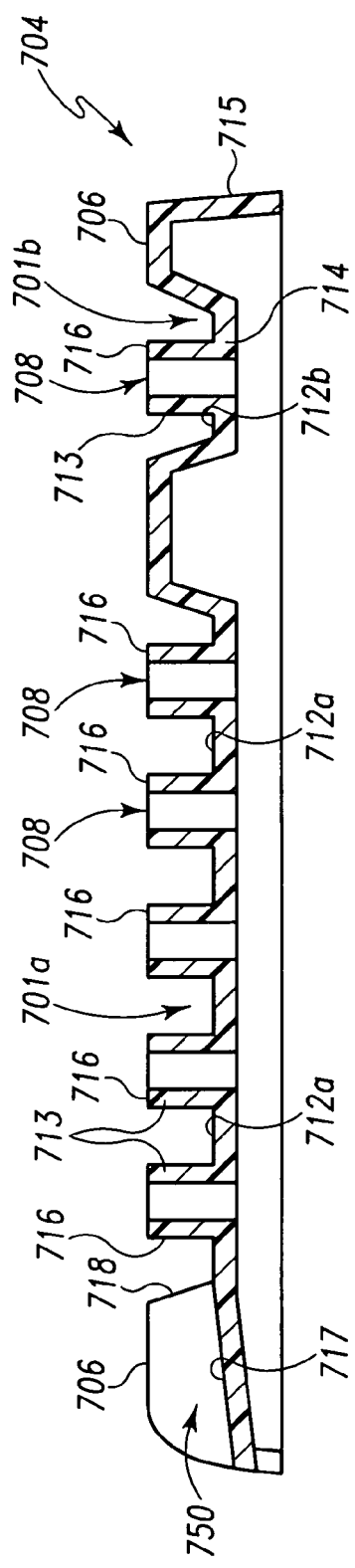
FIG. 27 is a cross-sectional view of the upper portion of the keyboard assembly illustrated in FIG. 25 taken along the line 27—27 in FIG. 25.

FIGS. 25–27 illustrate another embodiment of a keyboard assembly 700 in accordance with the present invention. The keyboard assembly 700 is a keyboard for a personal computer and has a plurality of keys 702 arranged in the conventional Qwerty or Dvorak format that a user strikes when operating the keyboard assembly 700. The keys 702 are of a conventional format, preferably each having a strike portion and a protrusion with retaining clips (not illustrated). In the illustrated embodiment, the keyboard assembly 700 includes a liquid resistant barrier therein having a plurality of deformable members, such as one of those described above. In an alternative embodiments, the keyboard assembly 700 does not include a liquid resistant barrier therein having a plurality of deformable members. The keyboard assembly 700 also includes a circuit board of a conventional construction that has a plurality of switches that are switched when the keys 702 are actuated.

The keyboard assembly 700 includes a housing 703 having an upper portion 704 and a lower portion 705. The upper portion 704 of the housing 703 includes an upper side 706 that typically faces a user of the keyboard assembly 700 during operation of the keyboard assembly. The bottom portion 705 of the housing 703 has a bottom side 707 that is located opposite from the upper side 706 and is the surface upon which the keyboard assembly 700 typically rests when a user strikes the keys 702. At least a portion of the bottom side 706 defines a lower-most elevation of the housing when the keyboard assembly is resting upon the bottom side. For example, the bottom side 706 may have a surface defined by legs, posts, or another area that rest upon a surface when a user is using the keyboard assembly 700. As is illustrated in FIGS. 25–27, the upper portion 704 of the housing 703 has two recessed surfaces 712a, 712b that each are recessed from the upper side 706 of the upper portion 704 to define two recesses 701a, 701b in the upper side of the housing. A plurality of members 713 protrude from each recessed surface 712a, 712b. In the illustrated embodiment, the members 713 are cylindrical protrusions that are elevated from the recessed surfaces 712a, 712b. Each member 713 includes an opening 708 that passes through a wall 714 of the upper portion 704 of the housing 703. Each opening 708 is sized to receive the protrusion of a key 702 so as to moveably retain the key in the opening.

In an alternative embodiment, the recesses 701a, 701b are combined to define one recess in the upper side of the housing 703. In a further embodiment, the upper portion 704 of the keyboard assembly 700 includes one or more members 713 that protrude from the recessed surface 712a and that each have a plurality of openings 708 passing therethrough. For example, in one embodiment the keyboard assembly 713 includes only one member 713 in the form of a rectangular or a stepped block that is elevated from the recessed surface 712a and that has a number of openings 708 passing therethrough.

Liquids that are spilled on the keyboard assembly 700 are generally received by the recesses 701a, 701b. Rather than accumulate in the recesses 701a, 701b, enter the openings 708, and cause damage to the internal components of the keyboard assembly 700, the keyboard assembly 700 includes drain channels 750a, 750b that permit liquid in the recesses 701a, 701b to drain from the keyboard assembly when the keyboard assembly is resting upon the bottom side 707. In the illustrated embodiment, the drain channels 750a are grooves or indentations in the uppers side 706 that extend from one edge 718 of the recess 701 to one of the transverse sides 715 of the housing 703. Hence, each drain channel 750a fluidly communicates an area external of the keyboard assembly 700 with the recess 701a. The drain channels 750b are configured the same as the drain channels 750a and fluidly communicate the recess 701b with the recess 701a such that fluid spilled in the recess 701b drains via the drain channels 750b into the recess 701a where it is communicated to the area external of the keyboard assembly by the drain channels 750a.

As is best illustrated in FIG. 27, a lower most surface 717 of each drain channel 750a is preferably at a lower elevation than the upper side 706, and more preferably at a lower elevation than the recessed surface 712 as measured with respect to the bottom side 707 such that liquid in the recess 701 tends to flow out of the recess into the drain channel and out of the keyboard assembly by the force of gravity when the bottom side rests upon a planar and horizontal surface. Likewise, a lower most surface of each drain channel 750b is preferably at a lower elevation than the upper side 706, and more preferably at a lower elevation than the recessed surface 712b as measured with respect to the bottom side 707 such that liquid in the recess 701b tends to flow out of the recess into the drain channels 750b to the drain channels 750a and thereafter out of the keyboard assembly by the force of gravity.

In the preferred embodiment, the recessed surface 712a of the recess 701a is inclined toward the drain channels 750a as measured with respect to horizontal when the bottom side 707 of the keyboard assembly is resting upon a planar and horizontal surface. Likewise, the recessed surface 712b of the recess 701b is inclined toward the drain channels 750b as measured with respect to horizontal when the bottom side 707 of the keyboard assembly is resting upon a planar and horizontal surface. Hence, any liquid in the recesses 701a, 701b tends to flow along the recessed surfaces 712a, 712b toward the drain channels 750a, 750b. In this manner, the housing 703 is configured such that liquid that has fallen in the recesses 701a, 701b is directed to an area external of the keyboard assembly 700 when the keyboard assembly is resting upon the bottom surface 707.

In an alternative embodiment, the recess 701b drains via separate drain channels to another one of the transverse sides 715 rather than to the recess 701a. That is, in this alternative embodiment, the recess 701b is not in communication with the recess 701a via the drain channels 750b. Rather, the recess 701b drains directly to an area external of the keyboard assembly 700 via drain channels configured similar to the drain channels 750a associated with the recess 701a.

As described above, the drain channels 750a, 750b are grooves or indentations in the upper side 706 of the upper portion 704. These drain channels 750a, 750b are preferably formed when molding the upper portion 704 of the keyboard from a plastic material. However, in alternative embodiments, the drain channels 750a, 750b may take other configurations and may be fabricated in other manners. For example, in one embodiment the drain channels 750a, 750b are cylindrical conduits defined by molding or machining and which are located underneath the upper side 706 (when the bottom side 707 is resting upon a flat and planar surface). In further embodiments, the drain channels 750a, 750b are at least partially defined by the lower portion 705 of the housing. For example, in one embodiment, one or more throughholes in the recess 701a communicate liquid in the recessed surface 712a of the recess with a channel in the lower portion 705, which in turn is in communication with the area external of the keyboard assembly 700.

Figure 28:
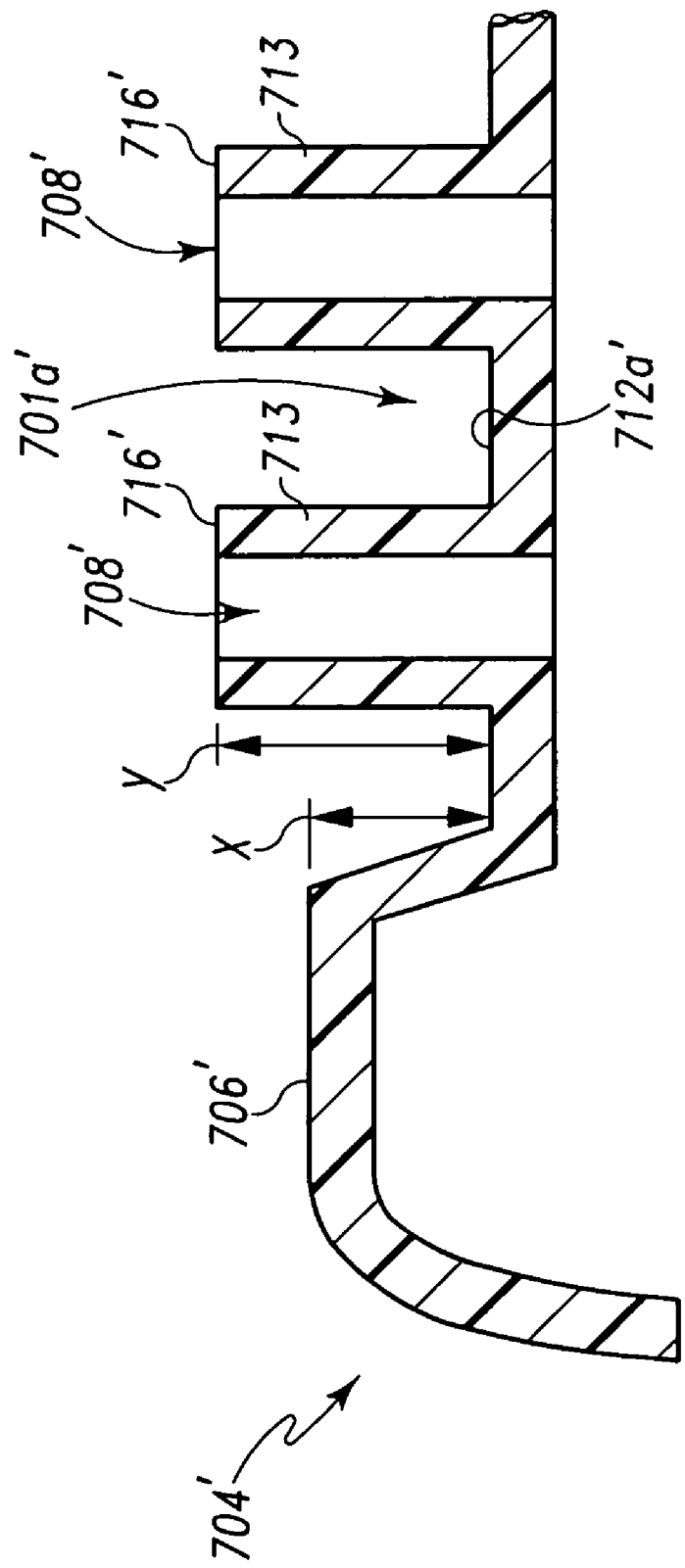
FIG. 28 is a partial cross-sectional view of an alternative embodiment of the upper portion of the keyboard assembly illustrated in FIG. 25.

In the illustrated embodiment, the upper-most surface 716 of each member 713 is located approximately 10 mm from the recessed surfaces 712a, 712b of the respective recesses 701a, 701b. Likewise, the upper side 706 of the upper portion 704 of the housing 703 is located approximately 10 mm from the recessed surfaces 712a, 712b. Hence, the upper-most surface 716 of each member and the upper side 706 are at approximately the same elevation as measured with respect to the recessed surfaces 712a, 712b of the respective recesses 701a, 701b. In an alternative embodiment, the upper-most surface 716 of each member is located below the upper side 706 as measured with respect to the respective recessed surface 712a, 712b. In a further embodiment of the keyboard assembly 700 illustrated in FIG. 28, the members 713' protrude from the recessed surface 712a' to an elevation located above the upper side 706' as measured with respect to the recessed surface 712a' when the keyboard assembly 700 is resting upon the bottom side. Hence, the distance Y between the upper-most surface 716' of each member 713' and the recessed surface 712a' is greater than the distance X between the upper side 706' and the recessed surface 712a'. That is, the upper-most surface 716' of each member 713' is located above the upper side 706' of the upper housing 704' as measured with respect to the recessed surface 712a' when the bottom side of the housing is resting upon a planar and horizontal surface. For example, in one embodiment the upper most surface 716' of each member 713' is between 0.5–5 mm above the upper side 706'. In one particular embodiment, Y is 10 mm, and X is 9 mm such that the difference between the distances X and Y is 1 mm. In a further embodiment of the keyboard assembly illustrated in FIG. 28, the keyboard assembly does not include any drain channels. That is, because the distance Y is greater than X, the inlet into the openings 708' is located above the upper side 706' when the bottom surface of the keyboard is resting on a planar and horizontal surface such that any liquid that falls into the recess 701a' in sufficient quantity as to fill the recess will flow over the upper side 706' and over the transverse sides 715' rather than into the openings 708'.

In other exemplary embodiments, a liquid resistant barrier is configured to fully seal electronic components. For example, a liquid resistant barrier can be placed both above and below the circuit board and/or other keyboard electronic components. It is advantageous if the upper and lower portions of the barrier are sealed to form a barrier to liquid entering between those upper and lower portions. The upper and lower portions can be sealed to each other, e.g., along their edges, or they can each be sealed to the keyboard housing, e.g., in the manner described above. In addition, for applications in which the keyboard is integrated into a device instead of being present as a separate keyboard, a liquid resistant barrier can also be utilized that provides protection for device components in addition to the keyboard components. For example, a liquid resistant barrier can be incorporated in a laptop or notebook computer, that is located under the keys covering the entire lower portion of the computer. A barrier installed in this manner thus can protect not only the keyboard electronic components, but also the majority of the computer electronics, including, for example, the central processing unit, memory chips, video chips, and the like. In one embodiment, a liquid resistant barrier is sealed to the perimeter housing.

Unless otherwise defined, all technical and scientific terms used herein have the same meaning as commonly understood by one of ordinary skill in the art to which this invention belongs. All patents and other references cited in the specification are indicative of the level of skill of those skilled in the art to which the invention pertains, and are incorporated by reference in their entireties, including any tables and figures, to the same extent as if each reference had been incorporated by reference in its entirety individually.

One skilled in the art would readily appreciate that the present invention is well adapted to obtain the ends and advantages mentioned, as well as those inherent therein. The methods, variances, and compositions described herein as presently representative of preferred embodiments are exemplary and are not intended as limitations on the scope of the invention. Changes therein and other uses will occur to those skilled in the art, which are encompassed within the spirit of the invention, are defined by the scope of the claims.

It will be readily apparent to one skilled in the art that varying substitutions and modifications may be made to the invention disclosed herein without departing from the scope and spirit of the invention. For example, a variety of materials may be used to construct liquid resistant barriers, and barriers and drain channels can be configured in many different ways. Thus, such additional embodiments are within the scope of the present invention and the following claims.

The invention illustratively described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Also, unless indicated to the contrary, where various numerical values are provided for embodiments, additional embodiments are described by taking any 2 different values as the endpoints of a range. Such ranges are also within the scope of the described invention.

Thus, additional embodiments are within the scope of the invention and within the following claims.

What is claimed is:

1. A keyboard assembly comprising
a plurality of keys;
a circuit board behind said keys; and
a liquid resistant barrier between said keys and said circuit board, said liquid resistant barrier extending beyond the peripheral edge of the circuit board and having a downward extending edge, said downward extending edge receiving and overlapping the perimeter of said circuit board.

2. The keyboard assembly of claim 1, further comprising a housing having an upper side and a bottom side located opposite from said upper side, said upper side having one or more openings in which said plurality of keys are located, said bottom side including a bottom surface upon which the keyboard assembly rests when a user strikes said keys;
wherein said circuit board comprising a plurality of switches actuateable by said plurality of keys is located inside said housing below said plurality of keys; and
said liquid resistant barrier is located between said plurality of keys and said circuit board and is configured such that said circuit board is protected from liquid passing down through said one or more openings.

3. The keyboard assembly of claim 2, wherein said housing has at least one drain channel that communicates an area external of said housing with an interior area of said housing, configured such that liquid that has passed through said openings is directed through said drain channel.

4. The keyboard assembly of claim 3, wherein said drain channel is disposed at a lower level than at least a portion of said liquid resistant barrier when said keyboard assembly rests in a normal use position on a planar and level support, and wherein said liquid resistant barrier is inclined with respect to said support, whereby liquid that has passed through said one or more openings is directed by said barrier to said drain channel.

5. The keyboard assembly of claim 2, said circuit board having opposing flexible layers that are separated by a gap.

6. The keyboard assembly of claim 2, said liquid resistant barrier being continuous in at least an area of said liquid resistant barrier that covers said circuit board.

7. The keyboard assembly of claim 2, said liquid resistant barrier abutting said circuit board.

8. The keyboard assembly of claim 2, said barrier including a curvilinearly contoured surface.

9. The keyboard assembly of claim 2, said barrier including a planar surface.

10. The keyboard assembly of claim 2, said at least one drain channel being located at or near said bottom side of said housing.

11. The keyboard assembly of claim 2, said housing having at least one well located so as to receive liquid that has passed over said liquid resistant barrier, said drain channel communicating said exterior area with said well.

12. The keyboard assembly of claim 2, said housing having a plurality of said drain channels.

13. The keyboard assembly of claim 2, said liquid resistant barrier being formed of at least one of a polymeric material and a rubber material.

14. The keyboard assembly of claim 2, further comprising a printed circuit board to translate the signal from the circuit board to an associated device.

15. The keyboard assembly of claim 14, said liquid resistant barrier covering an entirety of said printed circuit board.

16. The keyboard assembly of claim 2, said keyboard assembly being a keyboard for a personal computer.

17. The keyboard assembly of claim 2, said keyboard assembly including a cord for electrically connecting the keyboard assembly to another device.

18. The keyboard assembly of claim 2, said liquid resistant barrier including a plurality of liquid resistant barriers.

19. The keyboard assembly of claim 2, said liquid resistant barrier being one continuous piece.

20. The keyboard assembly of claim 2, said housing being sealed to said liquid resistant barrier.

21. The keyboard assembly of claim 2, said liquid resistant barrier having a perimeter that is at least as large as a perimeter of said one or more openings.

22. The keyboard assembly of claim 20, said barrier being sealed to said housing at an outermost edge of said liquid resistant barrier.

23. The keyboard assembly of claim 20, said housing having at least one lip that sealingly abuts said liquid resistant barrier.

24. The keyboard assembly of claim 20, said liquid resistant barrier and said housing being sealed at least partially by an adhesive.

25. The keyboard assembly of claim 20, said housing having a wall that surrounds a perimeter of said one or more openings, said wall having an edge that sealingly abuts said liquid resistant barrier.

26. The keyboard assembly of claim 2, wherein said liquid resistant barrier comprises a plurality of deformable members disposed to resist movement of said plurality of keys, said liquid resistant barrier at least partially defining means for preventing liquid that has passed through said openings from contacting said switches.

27. A keyboard assembly comprising:
a plurality of keys each having at least one protrusion; and
a housing having an upper side and a bottom side located opposite from said upper side and upon which the keyboard assembly rests when a user strikes said keys, said housing having a recessed surface defining a recess in said upper side of said housing, said upper side facing a user of said keyboard assembly when said keyboard assembly is resting upon said bottom side, said housing including a plurality of protrusions from said recessed surface, each of said protrusions having an opening passing therethrough, at least some of said openings receiving said protrusions of said keys, said housing including a liquid resistant barrier positioned beneath said keys, said liquid resistant barrier positioned above a circuit board, said liquid resistant barrier extending beyond the peripheral edge of the circuit board and having a downward extending edge which receives and overlaps the perimeter of said circuit board to direct liquid that has fallen into said recess away from said circuit board, said housing including a drain channel configured and located to direct liquid that has fallen into said recess to an area external of said housing when said keyboard assembly is resting upon said bottom side.

28. The keyboard assembly of claim 26, said housing having an upper portion and a lower portion that are attached to each other, said upper portion including said upper side, said recess, said plurality of members that protrude from said recessed surface, and said drain channel, said bottom portion including said bottom side upon which the keyboard assembly rests when the user strikes said keys.

29. The keyboard assembly of claim 26, said housing having four transverse sides that are substantially transverse to at least one of said upper side and said bottom side, said drain channel extending from said recess to at least one of said four transverse sides.

30. The keyboard assembly of claim 26, said drain channel including a groove in said upper surface.

31. The keyboard assembly of claim 26, wherein a lower most surface of said drain channel is located at a lower elevation than said recessed surface when said keyboard assembly is resting upon said bottom side.

32. A computer system, comprising
at least one central processing unit; and
a keyboard assembly comprising a housing having an upper side and a bottom side located opposite from said upper side, said upper side having one or more openings in which a plurality of keys are located, said bottom side including a bottom surface upon which the keyboard assembly rests when a user strikes said keys; a circuit board inside said housing below said plurality of keys comprising a plurality of switches actuateable by said plurality of keys; and a liquid resistant barrier located between said plurality of keys and said circuit board, wherein said liquid resistant barrier extends beyond the peripheral edge of the circuit board and has a downward extending edge receiving and overlapping the perimeter of said circuit board and is configured such that said circuit board is protected from liquid passing down through said one or more openings.

33. A method for cleaning residue from a computer keyboard, comprising
washing residue-bearing interior upper surfaces of a keyboard with a solvent or solution, wherein said keyboard comprises a liquid resistant barrier under the keys and covering electronic components in said keyboard, and wherein function of said keyboard is not damaged by said washing.

34. The method of claim 32, further comprising drying solvent from said keyboard following said washing.

35. A method for preventing computer keyboard damage by spilled liquids, comprising
providing a liquid resistant keyboard functionally connected with a computer, wherein said keyboard comprises
a housing having an upper side and a bottom side located opposite from said upper side, said upper side having one or more openings in which a plurality of keys are located, said bottom side including a bottom surface upon which the keyboard assembly rests when a user strikes said keys;
a circuit board inside said housing below said plurality of keys comprising a plurality of switches actuateable by said plurality of keys; and
a liquid resistant barrier located between said plurality of keys and said circuit board, said liquid resistant barrier extending beyond the peripheral edge of the circuit board and having a downward extending edge receiving and overlapping the perimeter of said circuit board and configured such that said circuit board is protected from liquid passing down through said one or more openings.

* * * * *